April 14, 1925.
E. GALASSI
BUMPER FOR MOTOR VEHICLES
Filed Aug. 9, 1924    2 Sheets-Sheet 2
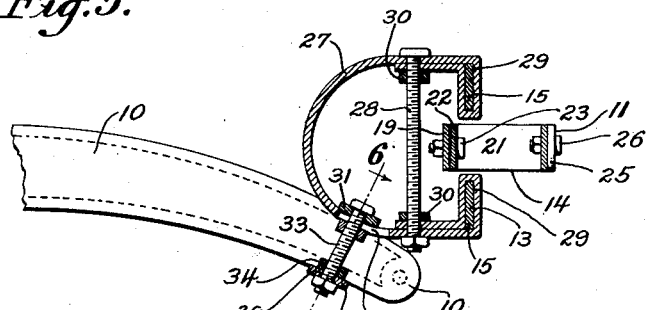
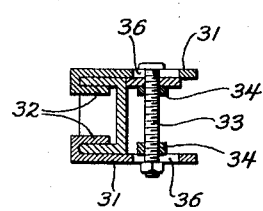
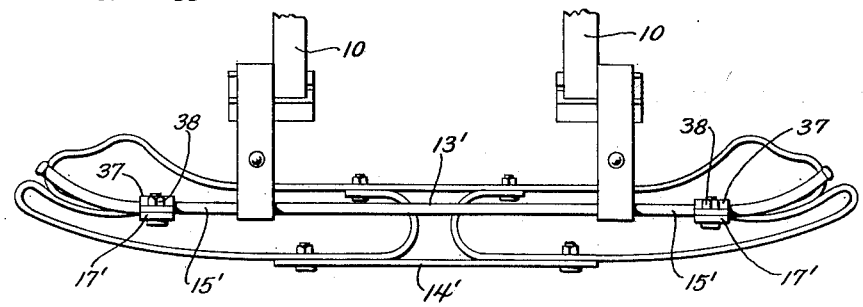
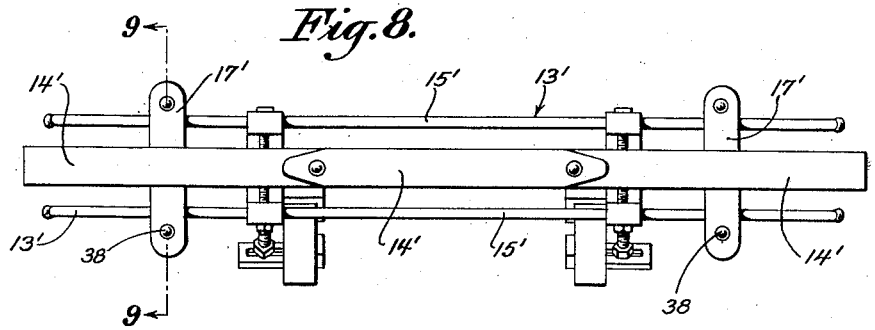
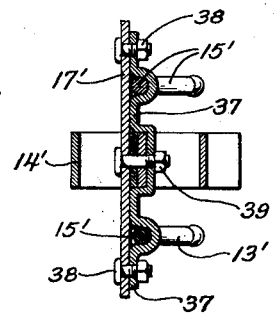
Ernest Galassi
INVENTOR
BY Victor J. Evans
ATTORNEY Patented Apr. 14, 1925.

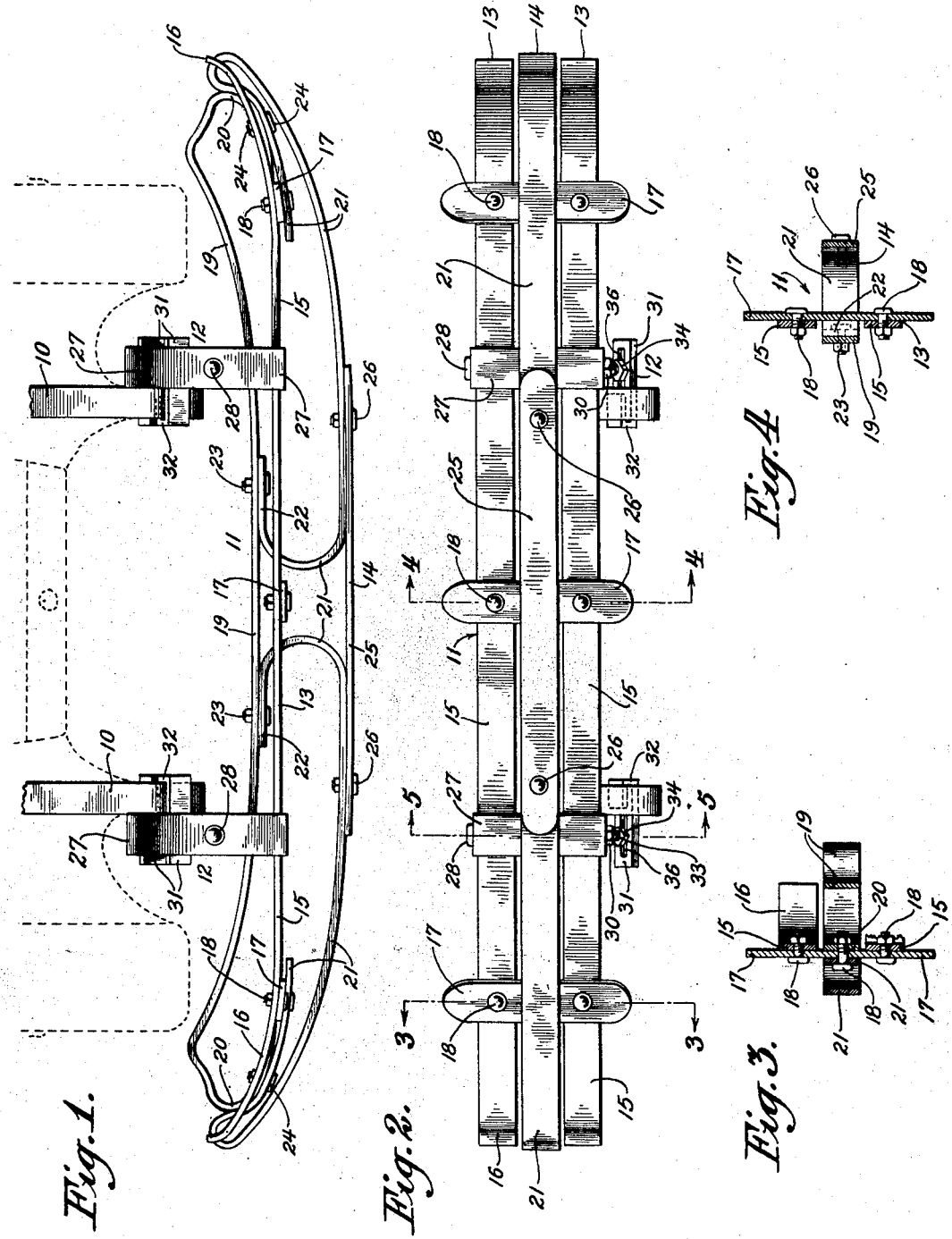

1,533,985

UNITED STATES PATENT OFFICE.

ERNEST GALASSI, OF BROOKLYN, NEW YORK.

BUMPER FOR MOTOR VEHICLES.

Application filed August 9, 1924. Serial No. 731,170.

*To all whom it may concern:*

Be it known that I, ERNEST GALASSI, a subject of the King of Italy, residing at Brooklyn, in the county of Kings and State of New York, have invented new and useful Improvements in Bumpers for Motor Vehicles, of which the following is a specification.

This invention relates to improvements in bumpers for motor vehicles and has for its primary object, the provision of a pair of sections, one of which is stationarily mounted to the chassis frame of an automobile, and the other of which is yieldably carried by the first said sections forward thereof for relieving the impact against the rigid section should the bumper come in contact with another vehicle or other object.

Another object of the invention resides in the provision of a bumper which includes adjustable attaching means for adapting the bumper to vehicles of different widths.

Another object of the invention is to provide a bumper which is simple in construction, cheap of manufacture, and easy to apply and remove from a motor vehicle.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a top plan view of my improved bumper shown applied to a motor vehicle.

Figure 2 is a front elevation of the same.

Figure 3 is a vertical sectional view on the line 3—3 of Figure 2.

Figure 4 is a similar view on the line 4—4 of Figure 2.

Figure 5 is a similar view on the line 5—5 of Figure 2.

Figure 6 is a vertical sectional view on the line 6—6 of Figure 5.

Figure 7 is a top plan view of a slightly modified form of my invention.

Figure 8 is a front view of the form shown in Figure 7.

Figure 9 is a vertical sectional view on the line 9—9 of Figure 8.

Referring more particularly to the drawing, the reference numeral 10 designates the ends of a chassis frame of a motor vehicle and to which my improved bumper 11 is shown attached by attaching means 12.

My improved bumper is constructed of flat material and includes a relatively rigid section 13 and a yieldable section 14 which is supported by the section 13 and which is disposed forward in advance of the said section 13.

As hereinbefore mentioned, the sections are constructed of a flat spring material but it is understood that the material may be of any shape so long as it is of a springy nature. The section 13 comprises a pair of identical members 15 which have their ends slightly bowed as at 16 and which members are spaced horizontally from the vertical plane of the section 13. The members are held spaced by cross bars 17 which are bolted to the members 15 as at 18 so that the sections may be removed should the occasion necessitate substitution of new parts. The cross bars 17 extend above and below the members 15 to prevent the bumper of another motor vehicle from passing over and under the members should the same come in contact with another motor vehicle equipped with the usual style of bumper.

The yieldable section 14 is mounted on a plane between members 15, and comprises a part 19, which lies at the rear of the members 15 and which extends approximately the entire length of the members as clearly shown in Figure 1 of the drawing. The ends of the part 19 are bent upon the body to provide spaced attaching portions 20 for the attachment of one end of a pair of identical parts 21. The parts 21 are positioned on the front side of the members 15 and have their other ends bent inwardly as at 22 for attachment to the part 19 by bolts 23, disposed on opposite sides of the center. Similar bolts 24 connect the other ends of the part 21 to the attaching portion 20. For closing the space between the parts 21, I provide a brace member 25 which is attached to the parts 21 by suitable bolts 26.

The attaching means 12 hereinbefore mentioned comprises a C-shaped bracket 27 which is adjustably mounted on the members 15 and which is held in the adjusted position by a bolt 28 which passes through the body of a bracket and through the ends of same, which ends are bent around the members 15 to provide eyes 29. Lock nuts 30 co-act with the bolt 28 and retain the bracket in its position of adjustment upon the members 15. Brackets 31 having hook portions 32 engage the flanges of the chassis frame and the bracket 27, and are connected to the bracket by a bolt 33 and securing nuts 34. The bolt 33 passes through a slot 35 in the bracket 27 and through aligned slots 36 in the brackets 31 as shown in Figures 5 and 6 of the drawing. By providing the slots in the brackets, it will be seen that the bumper will be adjusted to various angles according to the angle desired. By having the brackets 27 slidable on the member 15, it is possible to adjust the attaching means to a chassis frame of various widths.

From the foregoing description, it will be seen that when the bumper comes in contact with another vehicle or obstacle, the section 14 will be the first part of the device to strike, and as the same is formed of relatively springy material and is secured at its ends to the section 15, will move inwardly with respect to the section 13 thereby taking up the initial impact. The cross bars 17 limit the inward movement of the section 14 and when the same has reached the limit of its inward movement, the section 13 will then begin to pick up the impact. The section 13 is also of a springy nature and will yield a slight distance without causing breaking of the parts.

In Figures 7 to 9 inclusive, I have shown a slightly modified form of bumper which is identical to that shown in the preferred form with the exception of the section 13′ which comprises rounded members or bars 15′ connected by cross pieces 17′ and cleats 37 by bolts and nuts 38. The cross pieces 17′ and the cleats 37 are bolted to the section 14′ as at 39. The manner of operation is identical to that of the preferred form so that a description of the same is not believed necessary.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A bumper including a relatively rigid section comprising a pair of vertically spaced members and a yieldable section disposed forward of said rigid section and supported thereby, means for limiting the inward movement of said yieldable section, said means embodying spaced vertical members connecting said vertically spaced members and attaching means carried by said relatively rigid section.

2. A bumper including a relatively rigid section, attaching means for connecting said section to the chassis frame of a motor vehicle, and yieldable means carried by said rigid section forward of the same, and means on said rigid section for co-action with said yieldable section for limiting the inward movement of the last mentioned section, said attaching means being adjustable longitudinally upon said rigid section.

3. A bumper including a relatively rigid section, said section comprising a pair of spaced members, cross pieces connecting said members, a yieldable section carried by said rigid section, and disposed for movement between said members, said cross pieces serving to limit the inward movement of said yieldable section.

4. A bumper including a relatively rigid section, said section comprising a pair of spaced members, cross pieces connecting said members, a yieldable section carried by said rigid section, and disposed for movement between said members, said cross pieces serving to limit the inward movement of said yieldable section, attaching means carried by said members and adjustable thereon.

5. In combination with the ends of a chassis frame of a motor vehicle, of a relatively rigid structure, compound adjusting means for attaching said structure to said chassis frame and a yieldable means extending the length of the rigid section and forward thereof.

6. A bumper including a relatively rigid section, said section comprising a pair of spaced members, cross pieces connecting said members, a yieldable section carried by said rigid section, and disposed for movement between said members, said cross pieces serving to limit the inward movement of said yieldable section, and attaching means including a C-shaped bracket member adjustably mounted on said spaced members and adjustable clamping means for co-action with the chassis frame of a vehicle.

In testimony whereof I have affixed my signature.

ERNEST GALASSI.